United States Patent [19]

Suzuki et al.

[11] Patent Number: 4,712,633
[45] Date of Patent: Dec. 15, 1987

[54] MOTOR VEHICLE WITH HANDLEBAR

[75] Inventors: Takahisa Suzuki, Saitama; Shinichi Kuwahara, Tokyo; Yoshinori Kawashima, Saitama, all of Japan

[73] Assignee: Honda Giken Kogyo Kabushiki Kaisha, Tokyo, Japan

[21] Appl. No.: 899,984

[22] Filed: Aug. 25, 1986

[30] Foreign Application Priority Data

Aug. 23, 1985 [JP] Japan .................. 60-185110

[51] Int. Cl.⁴ .................. B62D 5/08
[52] U.S. Cl. .................. 180/149; 91/375 R
[58] Field of Search .............. 180/132, 149, 146; 91/375 R; 60/369, 384; 280/289 R, 281 R, 279

[56] References Cited

U.S. PATENT DOCUMENTS

| | | | |
|---|---|---|---|
| 2,613,649 | 10/1952 | Diebel | 91/375 R |
| 2,939,429 | 6/1960 | Charlson | 180/149 |
| 3,131,602 | 5/1964 | Ford | 91/375 R |
| 4,226,296 | 10/1980 | Higaki | 280/281 R |
| 4,337,962 | 7/1982 | Allen et al. | 280/279 |

*Primary Examiner*—John J. Love
*Assistant Examiner*—Donn McGiehan
*Attorney, Agent, or Firm*—Irving M. Weiner; Joseph P. Carrier; Pamela S. Burt

[57] ABSTRACT

A motor vehicle with a handlebar includes a vehicle frame assembly, at least one front wheel rotatably supported on the vehicle frame assembly, at least one rear wheel rotatably supported on the vehicle frame assembly, an engine mounted on the vehicle frame assembly between the front and rear wheels, and a hydraulicaly operated power steering system operatively coupled to the handlebar. The power steering system comprising a substantially cylindrical housing, an input shaft rotatably supported in the housing and coupled to the handlebar, an output shaft rotatably supported in the housing coaxially with the input shaft and operatively coupled to the front wheel, a hydraulically actuated vane motor coupled to the output shaft for applying a torque to the output shaft, and a control valve mechanism combined with the input and output shafts for controlling the vane motor based on a relative angular difference between the input and output shafts. The housing serves as part of the vehicle frame assembly.

9 Claims, 22 Drawing Figures

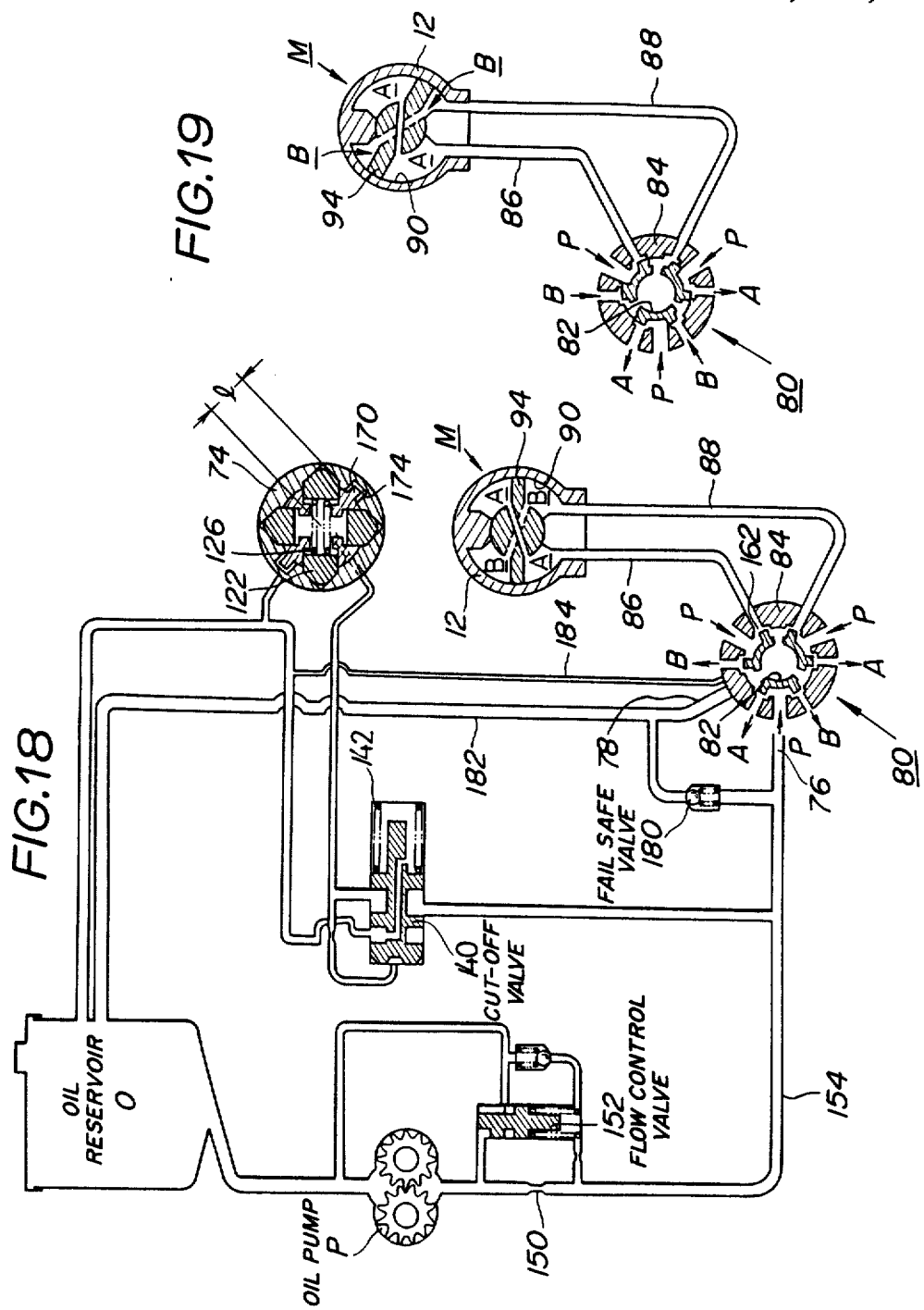

MOTOR VEHICLE WITH HANDLEBAR

BACKGROUND OF THE INVENTION

1. Field of the Invention

The present invention relates generally to a motor vehicle with a handlebar, and more particularly to such a handlebar motor vehicle having a hydraulically operated power steering system.

2. Description of the Relevant Art

There have heretofore been proposed many power steering systems for operating a servo system by utilizing the difference between angular displacements of input and output shafts. For example, Japanese Laid-Open Patent Publication No. 47(1972)-22844 discloses a hydraulically operated power steering system in which input and output shafts are disposed concentrically with each other, and a control valve mechanism and a feedback mechanism are interposed between the input and output shafts, with a rotary hydraulic motor being coupled to the output shaft. The power steering system of the disclosed type is generally employed in a motor vehicle having a steering wheel wherein the input and output shafts rotate through more than 360°. In order to meet such a large angle of rotation of the input and output shafts, however, the hydraulic motor assembly, in particular, is structurally complex since it requires a device for switching over hydraulic ports. A power steering system including a straight-motion cylinder-type hydraulic motor has also been proposed. This power steering system is also considerably complex in structure inasmuch as it requires a mechanism for converting reciprocating power of the cylinder to rotary power.

SUMMARY OF THE INVENTION

Accordingly, it is a primary object of the present invention to provide a motor vehicle with a handlebar, having a hydraulically operated power steering system including a hydraulic motor assembly of a simple construction.

Another object of the present invention is to provide a motor vehicle with a handlebar, having a hydraulically operated power steering system including a vane motor for efficiently producing rotary power.

According to an embodiment of the present invention, a motor vehicle with a handlebar includes a vehicle frame assembly, at least one front wheel rotatably supported on the vehicle frame assembly, at least one rear wheel rotatably supported on the vehicle frame assembly, an engine mounted on the vehicle frame assembly between the front and rear wheels, and a hydraulically operated power steering system operatively coupled to the handlebar. The power steering system comprises a substantially cylindrical housing, an intput shaft rotatably supported in the housing and coupled to the handlebar, an output shaft rotatably supported in the housing coaxially with the input shaft and operatively coupled to the front wheel, a hydraulically actuated vane motor coupled to the output shaft for applying a torque to the output shaft, and a control valve mechanism combined with the input and output shafts for controlling the vane motor based on a relative angular difference between the input and output shafts.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 18 is a schematic diagram of a hydraulic system according to the present invention;

FIG. 19 is a schematic diagram of a portion of the hydraulic system shown in FIG. 18;

DETAILED DESCRIPTION OF THE PREFERRED EMBODIMENTS

Figure 1:
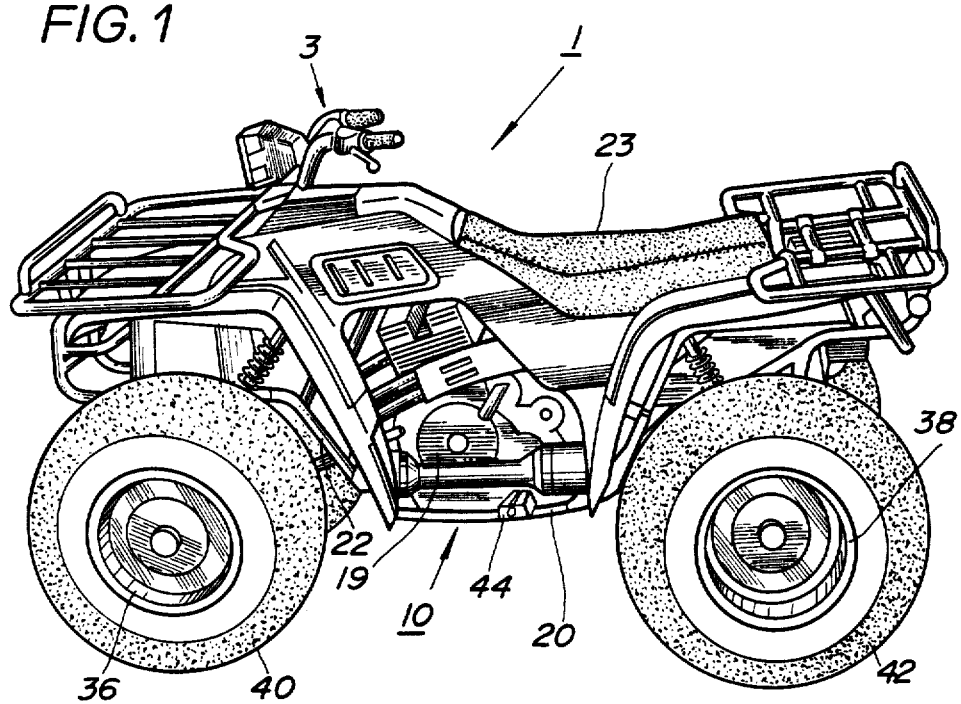
FIGS. 1 and 2 are perspective views of a four-wheeled motor vehicle with a handlebar according to an embodiment of the present invention, the motor vehicle having a hydraulically operated power steering system.
Figure 2:
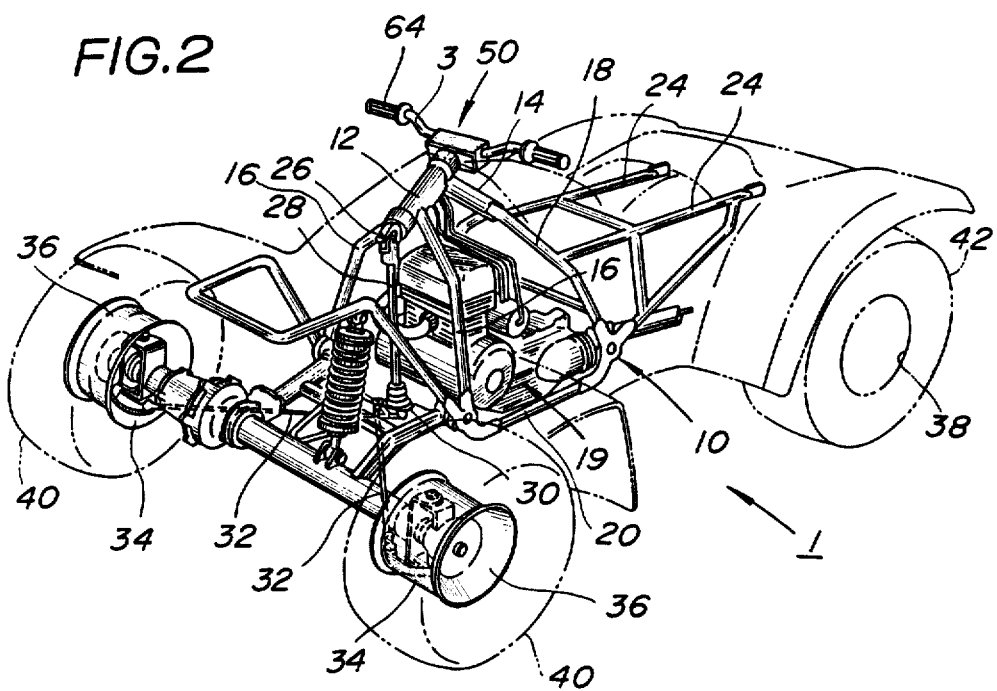

FIGS. 1 and 2 illustrate a four-wheeled motor vehicle 1 with a riding saddle for use on rough terrain, the motor vehicle 1 having a steering handlebar 3. The motor vehicle 1 includes a vehicle frame assembly, generally designated at 10, comprising a plurality of tubular members, i.e., a head pipe 12 by which the handlebar 3 is angularly movably supported, a main frame 14 joined to an upper portion of the head pipe 12, a pair of down tubes 16 joined to and extending obliquely downwardly from a lower portion of the head pipe 12, a pair of central tubes 18 joined to and extending obliquely downwardly from the mainframe 14, a pair of lower frames 20 interconnecting the lower ends of the down tubes 16 and the central tubes 18 and supporting an engine 19, a front tube 22 joined to and extending obliquely forwardly from front ends of the lower frames 20, and a pair of seat pipes 24 joined to and extending substantially horizontally rearwardly from central portions of the central tubes 18.

A steering rod 28 is coupled by a universal joint 26 to a shaft coupled to the handlebar 3 and projecting from the lower end of the head pipe 12. The steering rod 28 has a lower end secured to a steering arm 30 to which a pair of tie rods 32 is pivotally connected. The tie rods 32 are pivotally connected to two knuckle arms 34, respectively, on which two front wheels 36 are rotatably supported. Ultralow-pressure baloon tires 40 are mounted on the front wheels 36, respectively, and similarly ultralow-pressure baloon tires 42 are mounted on two rear wheels 38, respectively, rotatably supported on the frame assembly 10. As shown in FIG. 1, two foot steps 44 are attached to the lower frames 20, respectively.

Figure 3:
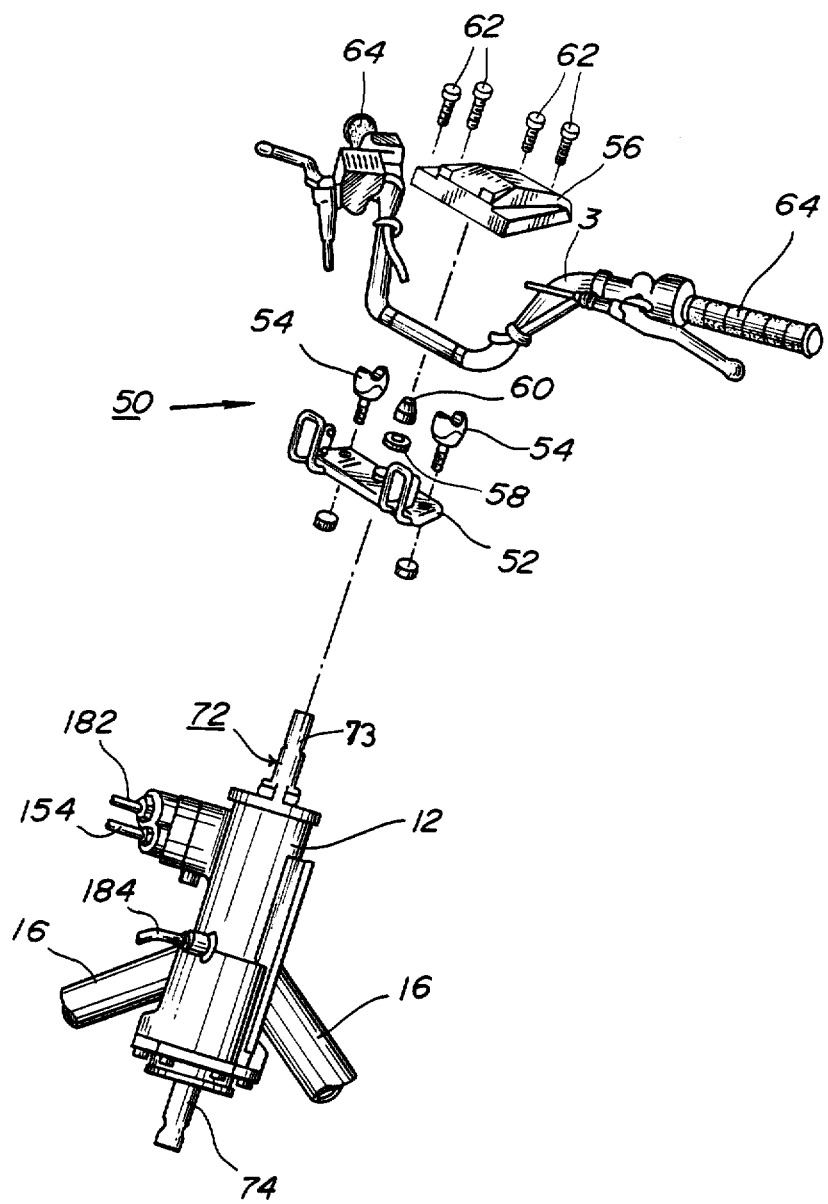
FIG. 3 is an exploded perspective view of the handlebar shown in FIG. 1, the view also showing the hydraulically operated power steering system.

As illustrated in FIG. 3, a handleholder, generally denoted at 50, comprises a base 52, two support members 54, and a cover 56. The base 52 is fitted over an upper end of an input shaft 72 which has serrations or splines 73 and projects from the head pipe 12. The base 52 is fastened to the input shaft 72 by a nut 60 with a washer 58 interposed between the base 52 and the nut 60. The support members 54 are threaded into the base 52 and support the handlebar 3. The cover 56 is fastened to the base 52 by bolts 62 in covering relation to a central portion of the handlebar 3. Grips 64 are mounted respectively on the opposite ends of the handlebar 3.

Figure 4:
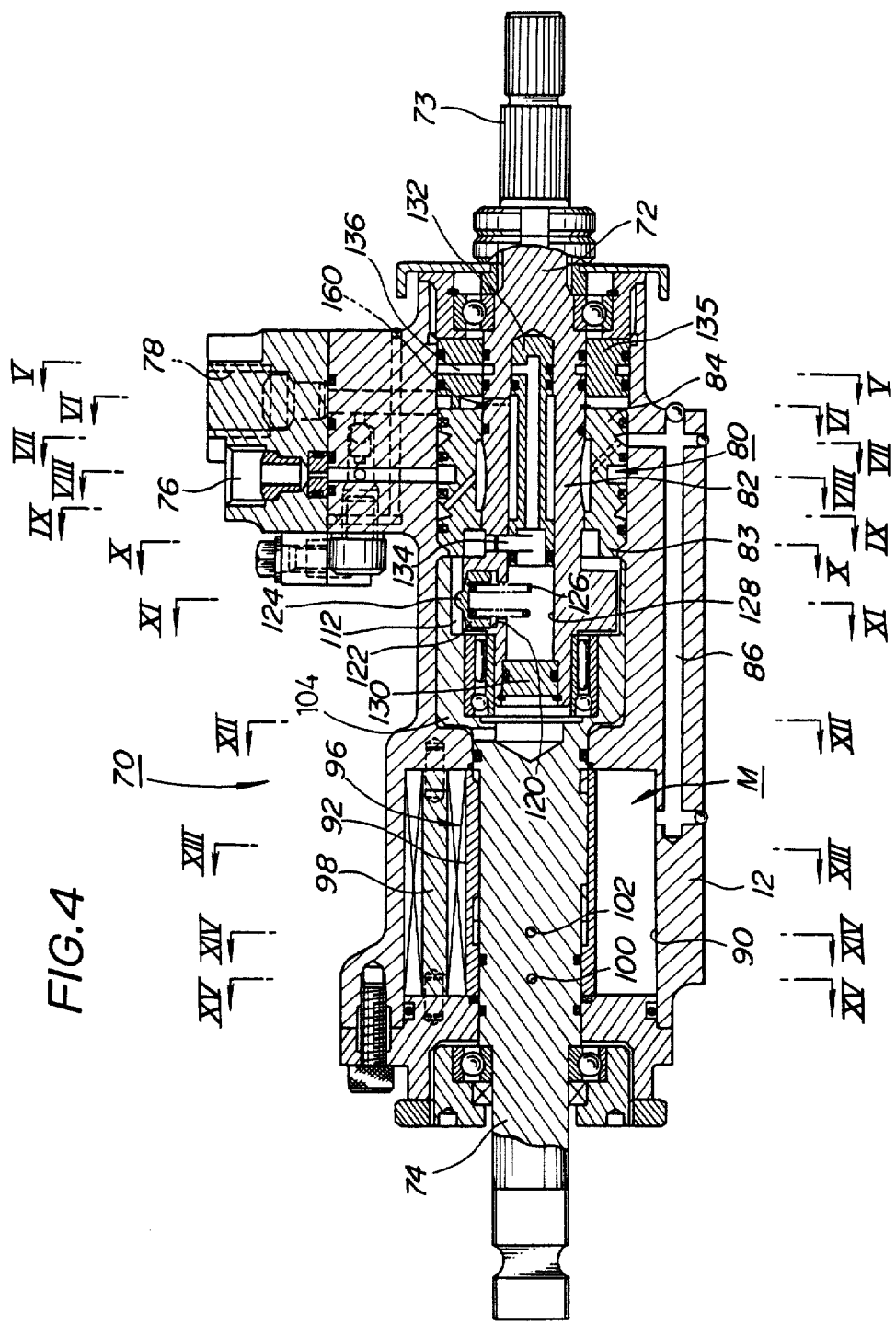
FIG. 4 is an enlarged longitudinal cross-sectional view of the hydraulically operated power steering system illustrated in FIG. 3.

FIG. 4 shows in detail a hydraulically operated power steering system, generally indicated at 70. The power steering system 70 has a substantially cylindrical housing serving as the head pipe 12, and the input shaft 72 and an output shaft 74 rotatably supported in the housing 12 coaxially with each other. The housing 12 has an inlet port 76 for passage of operating oil supplied from an oil reservoir O (FIG. 18), and an outlet port 78 for returning operating oil from the housing 12 back to the oil reservoir O. The inlet and outlet ports 76, 78 are defined in a side (as shown in FIG. 4) of the housing 12.

A control valve mechanism 80 is disposed in the housing 12 and generally comprises a rotor 82 integrally formed with the input shaft 72 and a sleeve 84 fitted over the rotor 82 and coupled to the output shaft 74 through a recess 83. When there is an angular phase difference between the rotor 82 and the sleeve 84, operating oil is selectively supplied to oil passages 86, 88 (described below).

Figure 13:
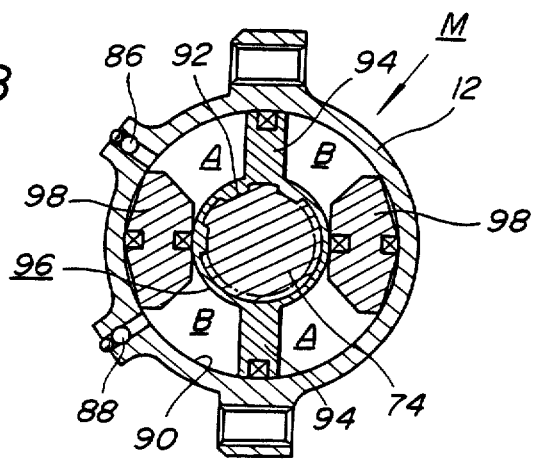
FIG. 13 is a cross-sectional view taken along line XIII—XIII of FIG. 4.
Figure 14:
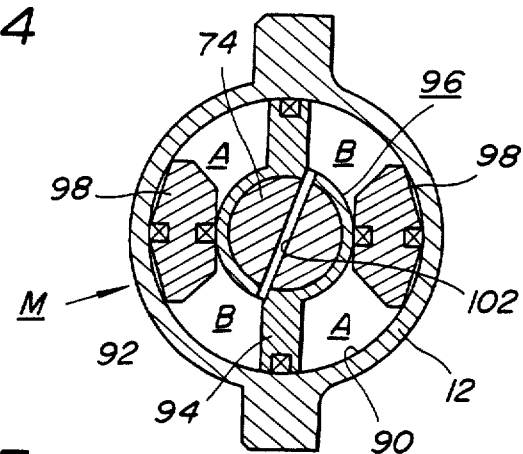
FIG. 14 is a cross-sectional view taken along line XIV—XIV of FIG. 4.
Figure 15:
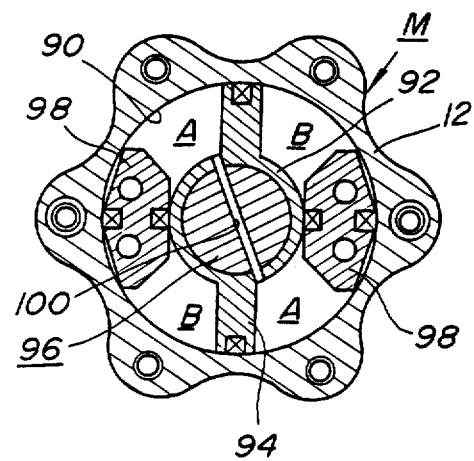
FIG. 15 is a cross-sectional view taken along line XV—XV of FIG. 4.

The oil passages 86, 88 (FIGS. 7 through 13 and 17) are defined in the wall of the housing 12 and open into a cylinder 90 defined in a lower portion of the housing 12 and extending from the control valve mechanism 80. As shown in detail in FIGS. 13 through 15, a vane rotor 96 disposed in the cylinder 90 comprises a tubular member 92 fitted over and keyed to the output shaft 74 and two vane elements 94 projecting radially outwardly from the outer peripheral surface of the tubular member 92 and held against the inner peripheral surface of the housing 12 in hydraulically sealing relation. Two separator elements 98 which are disposed in diametrically opposite relation are fixed to the inner peripheral surface of the housing 12 and held against the tubular member 92 of the vane rotor 96 in hydraulically sealing relation. The separator elements 98 serve to limit the angle through which the handlebar 3 can be angularly moved. The vane elements 94 and the separator elements 98 define two diametrically opposite first chambers A and two diametrically opposite second chambers B within the cylinder 3. The oil passage 86 opens into the first chambers A, whereas the oil passage 88 opens into the second chambers B. As illustrated in FIG. 15, the first chambers A are held in communication with each other through a passage 100 defined in the output shaft 74 and the tubular member 92. As illustrated in FIG. 14, the second chambers B are held in communication with each other through a passage 102 defined in the output shaft 74 and the tubular member 92. The cylinder 90 defined in the cylinder 12, the vane rotor 96, and the separators 98 jointly constitute a rotary hydraulic motor generally denoted at M.

Figure 5:
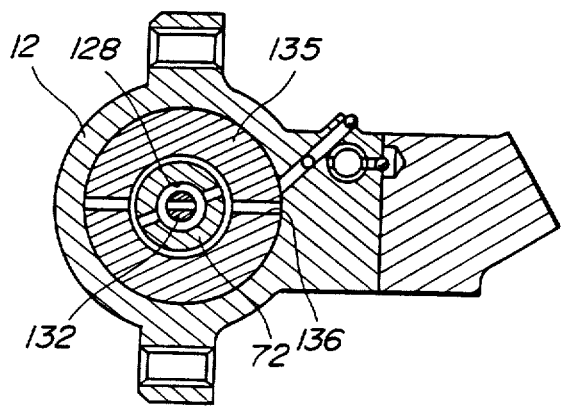
FIG. 5 is a cross-sectional view taken along line V—V of FIG. 4.
Figure 11:
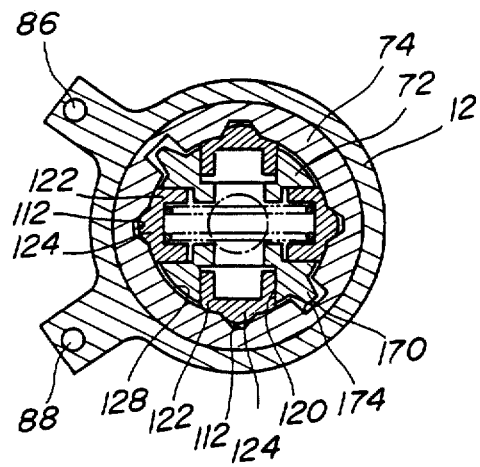
FIG. 11 is a cross-sectional view taken along line XI—XI of FIG. 4.
Figure 12:
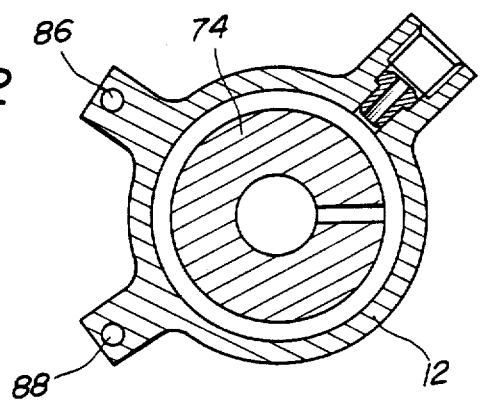
FIG. 12 is a cross-sectional view taken along line XII—XII of FIG. 4.
Figure 16:
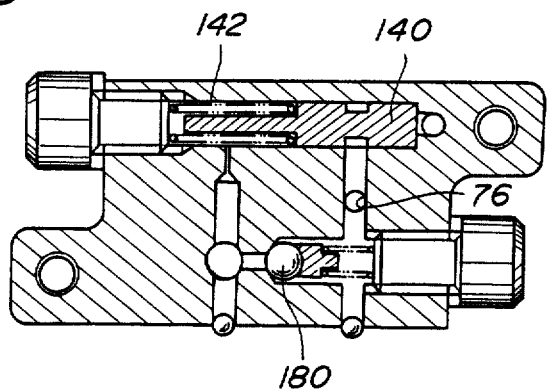
FIG. 16 is a cross-sectional view taken along line XVI—XVI of FIG. 8.
Figure 17:
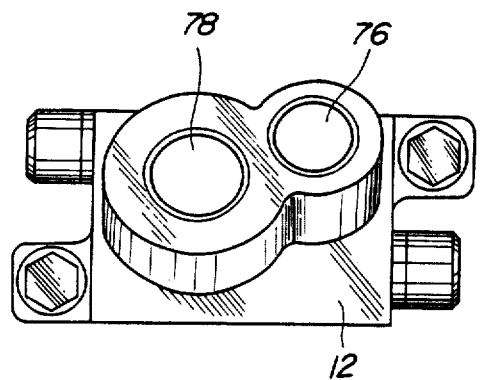
FIG. 17 is an end view as viewed in the direction of the arrow Z in FIG. 8.

As shown in FIG. 4, the output shaft 74 has an upper hollow larger-diameter portion 104 receiving the lower end portion of the input shaft 72. As illustrated in FIGS. 4 and 11, four right-angularly spaced cylinders 120 are defined in the lower end portion of the input shaft 72. Plungers 122 are disposed respectively in the cylinders 120 and have radially outward projections 124 engaging in recesses 112, respectively, defined in the inner peripheral surface of the upper larger-diameter portion 104 of the output shaft 74. A spring 126 is disposed under compression between one pair of plungers 122 for normally urging them toward the recesses 112. The input shaft 72 has a cavity 128 defined therein in communication with the cylinders 120. The cavity 128 has an open end closed off by a plug 130 (FIG. 4). A pipe 132 is accommodated in the cavity 128 and secured to the input shaft 72 by means of a pin 134. The pipe 132 extends to a position near the upper end of the housing 12 and communicates with an oil passage 136 defined in a ring 135 disposed in the upper end of the housing 12, as shown in FIG. 5. The oil passage 136 is supplied with operating oil supplied from the inlet port 76 through a cutoff valve 140 as shown in FIG. 16. The cutoff valve 140 is biased by a spring 142 such that when the pressure of operating oil supplied to the oil passage 136 exceeds a certain pressure level, the cutoff valve 140 cuts off fluid communication between the inlet port 76 and the oil passage 136.

FIG. 18 schematically shows a hydraulic system including an orifice 150 and a flow control valve 152 disposed downstream of the oil reservoir 0 via an oil pump P. When a pressure loss $\Delta P$ ($\alpha Q^2$, Q = flow rate) which is produced when the operating oil flowing through the orifice 150 exceeds a certain level, the flow control valve 152 is actuated to provide a bypass return flow passage across the oil pump P to keep the flow rate constant downstream of the orifice 150. The operating oil thus controlled flows through a pipe 154 and then the inlet port 76 into the control valve mechanism 80 in the housing 12.

Figure 6:
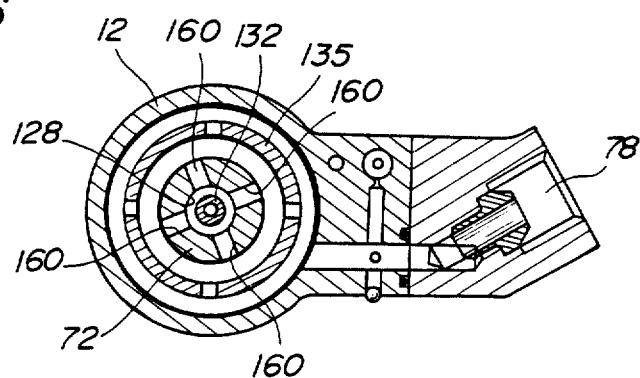
FIG. 6 is a cross-sectional view taken along line VI—VI of FIG. 4.
Figure 7:
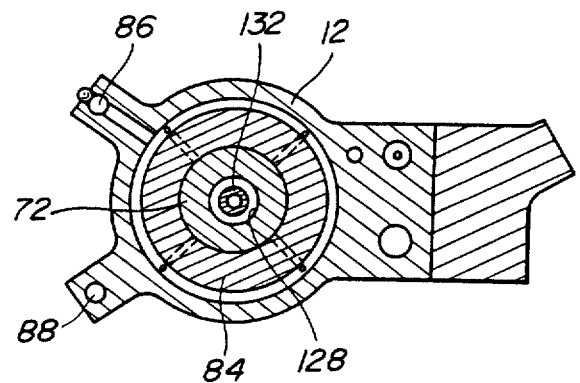
FIG. 7 is a cross-sectional view taken along line VII—VII of FIG. 4.
Figure 8:
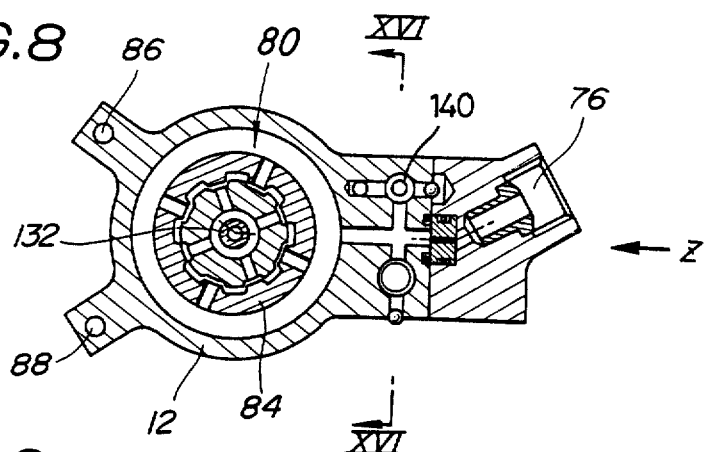
FIG. 8 is a cross-sectional view taken along line VIII—VIII of FIG. 4.
Figure 9:
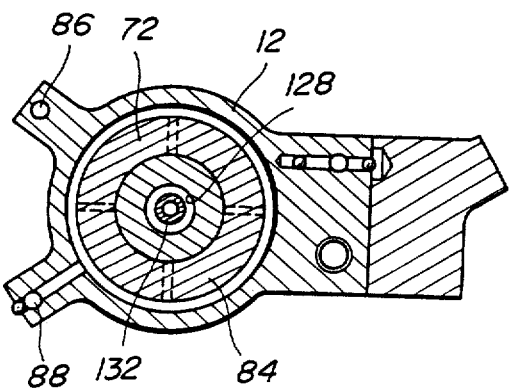
FIG. 9 is a cross-sectional view taken along line IX—IX of FIG. 4.
Figure 10:
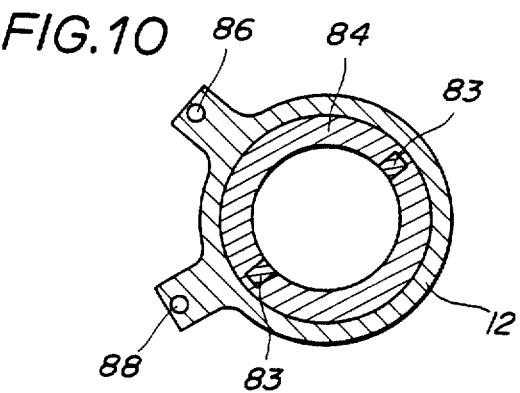
FIG. 10 is a cross-sectional view taken along line X—X of FIG. 4.

When the input shaft 72 is turned clockwise as shown in FIG. 19, the inlet port 76 and the first chambers A are connected to each other through the oil passage 86. At this time, the second chambers B are connected to the cavity 128 of the input shaft 72 through the oil passage 88. The cavity 128 is connected to the outlet port 78 through oil passages 160 defined in the input shaft 72, as shown in FIGS. 4 and 6. Since the operating oil is supplied to the first chambers A and discharged from the second chambers B, the vane rotor 96 rotates counterclockwise in the direction of the arrow B (FIG. 19) to produce a torque on the output shaft 74. Therefore, a boosted torque can be generated on the output shaft 74 by a torque which is applied by the driver to the extent required to produce an angular difference between the input and output shafts 72, 74.

In FIGS. 18 and 19, the control valve mechanism 80 is capable of pressure control as is known in the art. When a clearance 162 (corresponding to the angular difference between the input and output shafts 72, 74) is increased, the pressure in the oil passage 86 is also increased. More specifically, a pressure proportional to the relative angular difference between the input and output shafts 72, 74 is developed in the hydraulic motor M, and the output torque is proportional to the pressure in the hydraulic motor M.

While the handlebar 3 is being substantially power-assisted (at this time, there is an angular difference between the input and output shafts 72, 74), the output torque applied to the output shaft 74 is commensurate with the load from the road surface, and hence the pressure in the hydraulic motor M is commensurate with the load from the road surface. The input torque applied by the driver to the input shaft 72 is commensurate with thrust forces of the plungers 122. When the load from the road surface is below a prescribed level, the cutoff valve 140 is not operated, and the cavity 128 and the cylinder 90 are held in communication with each other, so that the oil pressure in the cavity 128 is equal to that in the cylinder 90. As a consequence, the torque applied to the input shaft 72 by the thrust forces of the plungers 122 is commensurate with the output shaft, and hence the driver feels "reaction" in steering the motor vehicle. When the load from the road surface exceeds the prescribed level, the cutoff valve 140 is operated to cut off the fluid communication between the cavity 128 and the cylinder 90. Even if the resistance from the road surface is increased, therefore, the pressure in the cavity 128 is not affected thereby, and the torque on the input shaft 72 is not increased.

The hydraulic system shown in FIG. 18 also includes a fail-safe valve 180, a discharge pipe 182, and a drain pipe 184.

Figure 20:
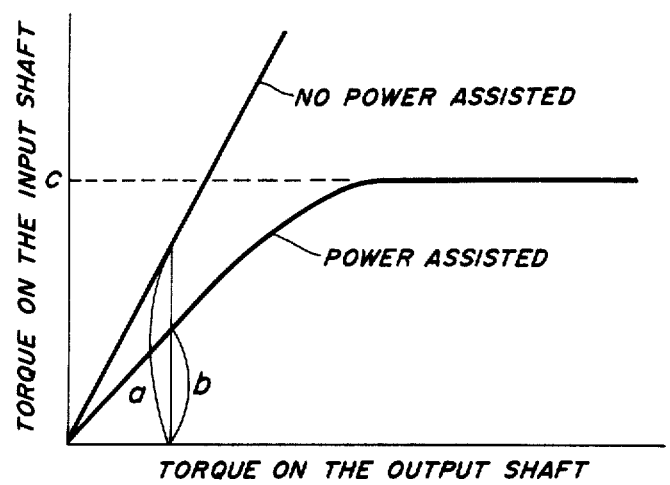
FIG. 20 is a graph showing a power assist ratio.

As shown in FIG. 18, a moment arm l for converting the thrust forces of the plungers 122 to a resistive torque, i.e., a reactive torque is reduced as the plungers 122 are moved radially inwardly (upon increase in the angular difference between the input and output shafts 72, 74). A power assist ratio a/b in FIG. 20 is determined by areas of the plungers 122 which bear the pressure, and an output coefficient of the control valve mechanism. An upper torque limit c can be varied by adjusting the cutoff valve 140.

As illustrated in FIG. 11, the input shaft 72 has a pair of diametrically opposite teeth 170 and the output shaft 74 has a pair of diametrically opposite recesses 174 receiving the teeth 170, respectively. The teeth 170 and the recesses 174 jointly serve as a manual coupling. The manual coupling is effective in limiting the angular difference between the input and output shafts 72, 74. When the hydraulic system fails, the input and output shafts 72, 74 are mechanically coupled by the manual coupling to allow steering operation. As shown in FIG. 18, the fail-safe valve 180 is positioned near the inlet port 76 for minimizing the resistance to flow in the oil passages in the event of hydraulic system failure. If the pressure difference between the inlet port 76 and the outlet port 78 is reversed, then the inlet and outlet ports 76, 78 are connected by the fail-safe valve 180 to hold the flow resistance to a minimum.

Figure 21:
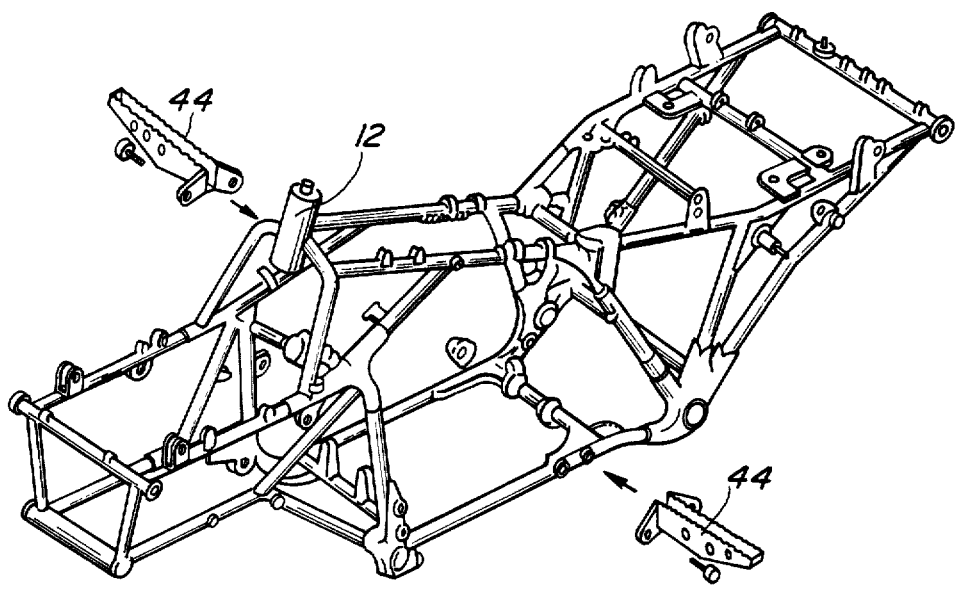
FIG. 21 is a perspective view of a modified vehicle frame assembly for use in a four-wheeled motor vehicle with a riding saddle.

FIG. 21 illustrates a modified vehicle frame assembly for use in a four-wheeled motor vehicle with a riding saddle, the housing 12 being secured to the vehicle frame assembly.

Figure 22:
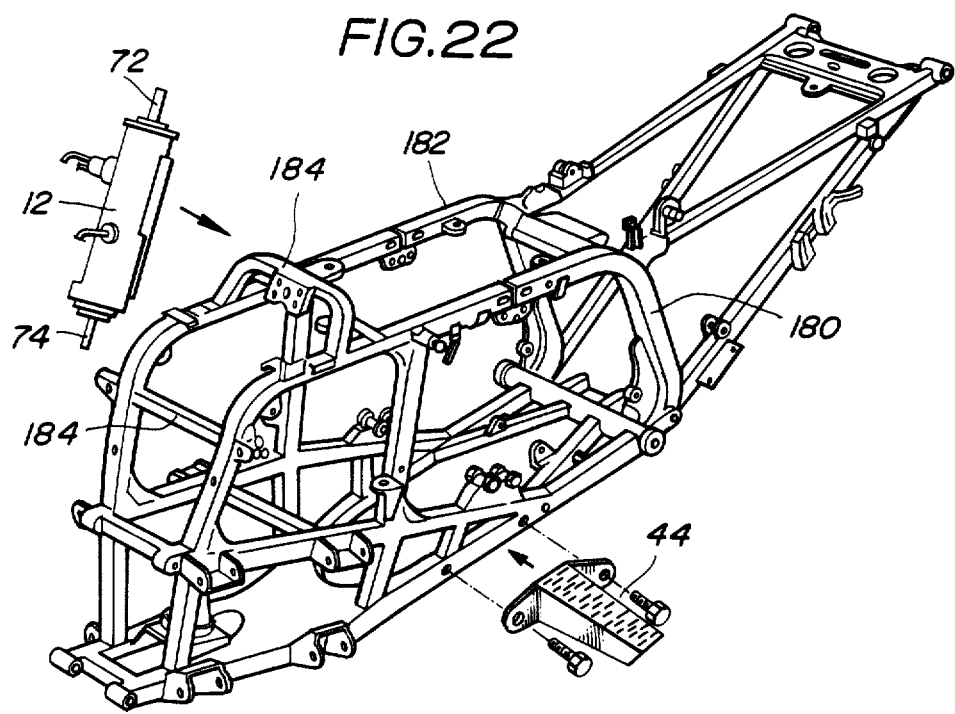
FIG. 22 is a perspective view of another modified vehicle frame assembly for use in a four-wheeled motor vehicle with a riding saddle.

FIG. 22 shows another modified vehicle frame assembly for use in a four-wheeled motor vehicle with a riding saddle. The vehicle frame assembly includes a pair of laterally spaced tubular members 180, 182 and a plurality of cross members 184 extending transversely of the frame assembly and interconnecting the tubular members 180, 182. The housing 12 is detachably mounted on one of the cross members 184 and extends substantially vertically. The housing 12 doubles as a head pipe.

While a four-wheeled motor vehicle with a riding saddle has been described by way of example, it can readily occur to those skilled in the art that the principles of the present invention are also applicable to two-wheeled or three-wheeled motor vehicles.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motor vehicle with a handlebar, comprising:
   a vehicle frame assembly;
   at least one front wheel rotatably supported on said vehicle frame assembly;
   at least one rear wheel rotatably supported on said vehicle frame assembly;
   an engine mounted on said vehicle frame assembly between said front and rear wheels;
   a hydraulically operated power steering system operatively coupled to said handlebar, and
   said hydraulically operated power steering system comprising:
   a substantially cylindrical housing;
   an input shaft rotatably supported in said housing and coupled to said handlebar;
   an output shaft rotatably supported in said housing coaxially with said input shaft and operatively coupled to said front wheel; means for limiting the relative angular difference between said input and said output shafts.
   a hydraulically actuated vane motor coupled to said output shaft for applying a torque to said output shaft; and
   a control valve mechanism combined with said input and output shafts for controlling said vane motor based on a relative angular difference between said input and output shafts.

2. A motor vehicle according to claim 1, said means for limiting the relative angular difference comprises a pair of diametrically opposite teeth on said input shaft and a pair of diametrically opposite recesses in said output shaft, said teeth engaging in said recesses, respectively.

3. A motor vehicle according to claim 1, including handlebar attachment means by which said handlebar is mounted on said input shaft, said handlebar attachment means comprising a base fixed to an upper end of said input shaft, support members threaded in said base and supporting said handlebar, and a cover covering said handlebar.

4. A motor vehicle according to claim 1, wherein said hydraulically actuated vane motor comprises a first cylinder defined in a lower portion of said housing, a vane rotor having a tubular member disposed in said cylinder and keyed to said output shaft and vane elements mounted on said tubular member, and separator elements mounted on an inner peripheral surface of said housing for limiting angular movement of said handlebar to a prescribed angle.

5. A motor vehicle according to claim 1, wherein said input shaft has a plurality of second cylinders defined in a lower portion thereof and a plurality of plungers disposed respectively in said second cylinders, said output shaft having recesses defined in an inner peripheral surface thereof, said plungers having projections normally urged into said recesses, respectively, by springs disposed between said plungers.

6. A motor vehicle according to claim 1, wherein said vehicle frame assembly comprises a plurality of tubular members, said housing being one of said tubular members.

7. A motor vehicle according to claim 6, wherein said housing serves as a head pipe of said vehicle frame assembly.

8. A motor vehicle according to claim 1, wherein said vehicle frame assembly has a pair of laterally spaced tubular members and a plurality of cross members extending transversely of the vehicle frame assembly and interconnecting said tubular members, said housing being detachably mounted to one of said cross members and extending substantially vertically.

9. A motor vehicle according to claim 1, wherein said vehicle frame assembly has a saddle seat on an upper portion thereof and a pair of foot steps on a lower portion thereof.

* * * * *

UNITED STATES PATENT AND TRADEMARK OFFICE
CERTIFICATE OF CORRECTION

PATENT NO. : 4,712,633
DATED : December 15, 1987
INVENTOR(S) : Suzuki et al.

It is certified that error appears in the above-identified patent and that said Letters Patent is hereby corrected as shown below:

```
Column 1, line 56, change "intput" to --input--.
Column 2, line 67, change "mainframe" to --main frame--.
Column 3, line 14, change "baloon" to --balloon--;
          line 16, change "baloon" to --balloon--;
          line 20, change "handleholder" to --handle holder--.
Column 6, line 48 (claim 1, line 20), after "shafts" change the period to a semicolon;
          line 56 (claim 2, line 1), after the comma insert --wherein--.
In the Abstract, line 6, change "hydraulicaly" to --hydraulically--.
```

Signed and Sealed this

Seventh Day of June, 1988

Attest:

DONALD J. QUIGG

Attesting Officer

Commissioner of Patents and Trademarks